United States Patent
Elder et al.

(10) Patent No.: US 8,134,333 B2
(45) Date of Patent: Mar. 13, 2012

(54) BATTERY AND ULTRACAPACITOR DEVICE AND METHOD OF USE

(75) Inventors: Ronald Carl Elder, Livonia, MI (US); Xiao Guang Yang, Northville, MI (US); Franco Leonardi, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/858,041

(22) Filed: Aug. 17, 2010

(65) Prior Publication Data

US 2011/0163699 A1 Jul. 7, 2011

(51) Int. Cl.
| | |
|---|---|
| H02J 7/00 | (2006.01) |
| H02M 3/06 | (2006.01) |
| H02M 3/18 | (2006.01) |
| H02J 9/00 | (2006.01) |
| H02P 9/00 | (2006.01) |
| B60K 6/20 | (2007.10) |
| B60K 1/00 | (2006.01) |

(52) U.S. Cl. ........ 320/104; 320/134; 320/116; 320/166; 320/167; 307/109; 307/110; 307/150; 307/153; 180/65.21; 180/65.31

(58) Field of Classification Search .......... 320/116, 320/134, 166, 167; 307/109, 110, 150, 153; 180/65.21, 65.31

See application file for complete search history.

(56) References Cited

U.S. PATENT DOCUMENTS

| | | | |
|---|---|---|---|
| 5,426,561 A | 6/1995 | Yen et al. | |
| 5,429,895 A | 7/1995 | Lian et al. | |
| 5,439,756 A * | 8/1995 | Anani et al. | 429/9 |
| 5,585,999 A | 12/1996 | De Long et al. | |
| 5,621,609 A | 4/1997 | Zheng et al. | |
| 5,751,541 A | 5/1998 | Li et al. | |
| 5,926,361 A | 7/1999 | Alford | |
| 5,986,876 A | 11/1999 | Stepanov et al. | |
| 6,181,545 B1 | 1/2001 | Amatucci et al. | |
| 6,181,546 B1 | 1/2001 | Stepanov et al. | |
| 6,187,061 B1 | 2/2001 | Amatucci et al. | |
| 6,265,851 B1 * | 7/2001 | Brien et al. | 320/162 |
| 6,628,504 B2 | 9/2003 | Volfkovich et al. | |
| 7,528,581 B2 * | 5/2009 | Miyazaki et al. | 320/163 |
| 7,808,214 B2 * | 10/2010 | Bartilson | 320/167 |
| 2003/0077515 A1 * | 4/2003 | Chen et al. | 429/231.8 |

* cited by examiner

*Primary Examiner* — Patrick Assouad
*Assistant Examiner* — Steve T Chung
(74) *Attorney, Agent, or Firm* — Brooks Kushman P.C.

(57) ABSTRACT

A battery and ultracapacitor device for use in a vehicle includes a positive electrode, a first negative electrode, a second negative electrode, a first separator disposed between the positive electrode and the first and second negative electrodes, and a controller communicating with the positive electrode, the first negative electrode, and the second negative electrode. A first negative electrode has a first composition and communicates with the first positive electrode. The second negative electrode has a second composition and is adjacent to the first negative electrode and a second separator. The second negative electrode communicates with the positive electrode and the first negative electrode. The first negative electrode comprises a secondary battery negative electrode. The second negative electrode comprises an ultracapacitor negative electrode.

19 Claims, 5 Drawing Sheets

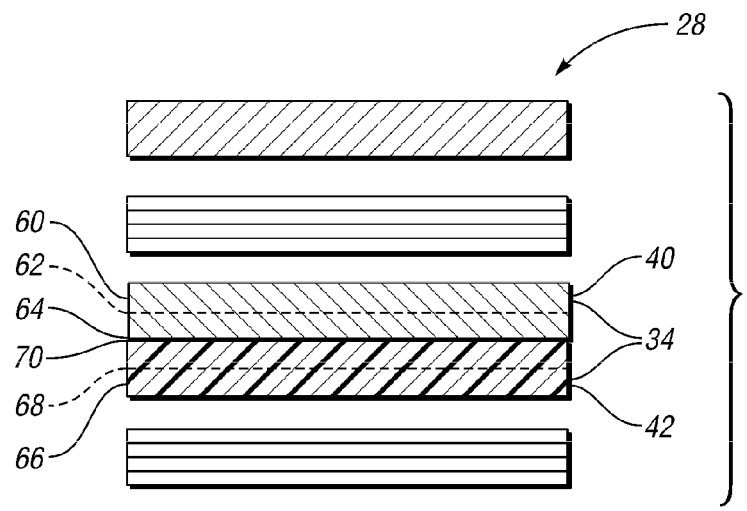
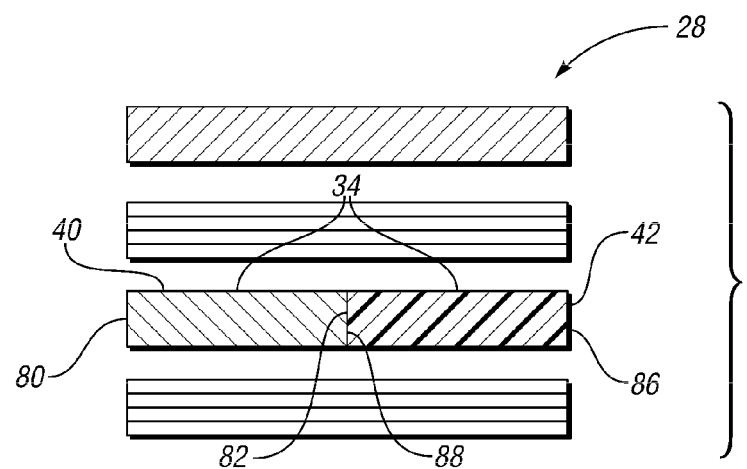
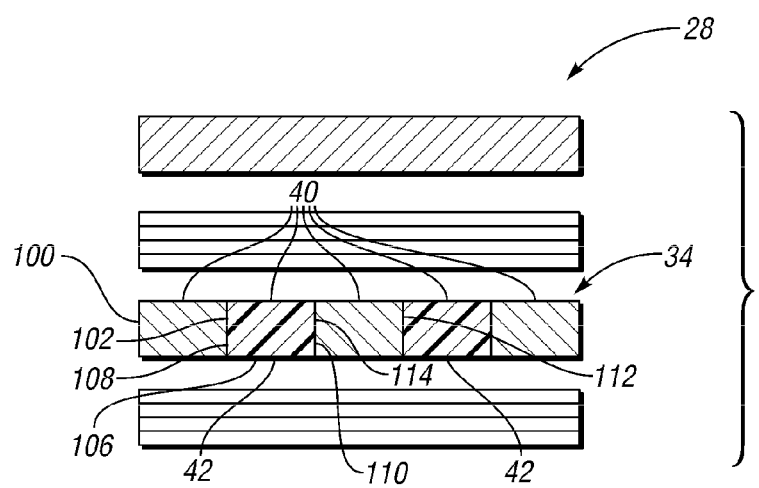

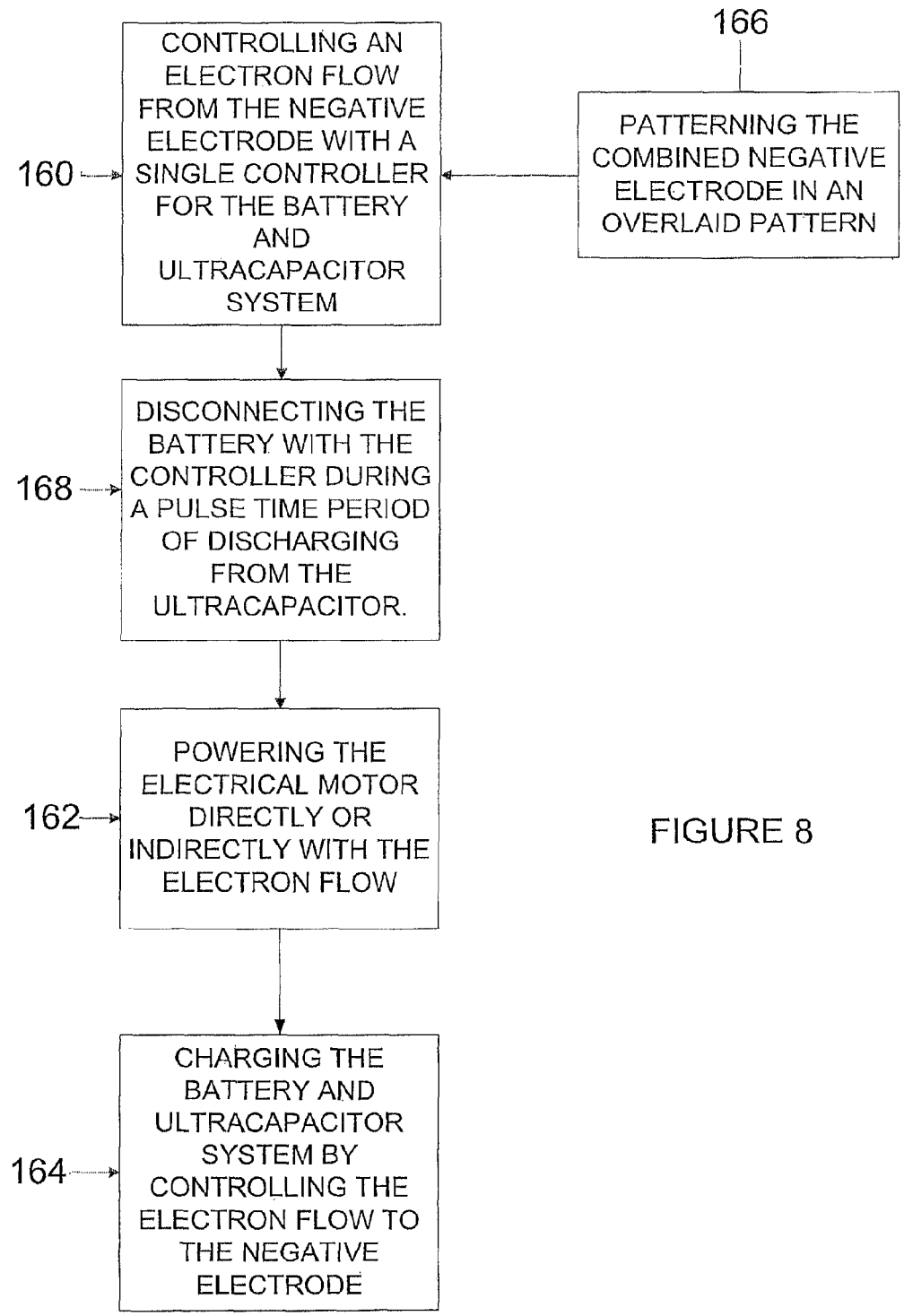

BATTERY AND ULTRACAPACITOR DEVICE AND METHOD OF USE

BACKGROUND

1. Technical Field

This disclosure relates to a battery and ultracapacitor device at the single cell level and the method of use.

2. Background Art

Some hybrid electric vehicles (HEVs) incorporate a high voltage battery device as a primary energy source and an ultracapacitor to provide high current pulses of a short duration. This device design provides excellent power and sufficient energy for powering HEVs.

Using at least two sources of energy to power the HEVs requires multiple control devices that add weight, and additional cost.

SUMMARY

According to at least one embodiment disclosed herein, a battery and ultracapacitor device for use in a vehicle reduces the number of control devices that add weight and occupy space on a vehicle. The device includes a battery and ultracapacitor cell having a positive electrode, a first negative electrode, a second negative electrode, a first separator, and a controller. The first negative electrode has a first composition and communicates with the positive electrode. The second negative electrode has a second composition and is adjacent to the first negative electrode. The second negative electrode is also adjacent to a second separator. A second negative electrode communicates with the positive electrode and the first negative electrode. The first separator is disposed between the positive electrode and the first and second negative electrodes. The controller communicates with the positive electrode, the first negative electrode, and the second negative electrode. The first negative electrode comprises a secondary battery negative electrode and the second negative electrode comprises an ultracapacitor negative electrode.

According to another embodiment, a battery and ultracapacitor device includes at least one battery and ultracapacitor cell having a secondary battery cell, an electrochemical double layer capacitor, and a controller. The secondary battery cell includes a positive electrode and a first negative electrode comprising a first segment. The electrochemical double layer capacitor comprises the positive electrode and a second negative electrode comprising a second segment. The controller for controlling the device to achieve either charging or discharging of at least one cell communicates with both the secondary battery cell and the electrochemical double layer capacitor.

In yet another embodiment, a method for powering an electric motor for use in a vehicle is disclosed. The vehicle has an electrical charging system using a battery and ultracapacitor device. The battery and ultracapacitor device includes at least one battery and ultracapacitor cell having a nickel oxyhydroxide positive electrode, a combined negative electrode having a metal hydride negative electrode portion and an active carbon negative electrode portion. The combined negative electrode communicates with the positive electrode. The positive electrode and the active carbon negative electrode portion comprise an ultracapacitor portion of the cell. The positive electrode and the metal hydride negative electrode portion comprise a battery portion cell. A separator disposed between the positive electrode and the combined negative electrode electrically isolates the positive and combined negative electrodes. The method includes the steps of controlling an electron flow from the combined negative electrode using a single controller communicating with the battery and the ultracapacitor device when electrically discharging the device. The electric motor of the vehicle is powered using the electron flow.

BRIEF DESCRIPTION OF THE DRAWINGS

FIG. 3 schematically illustrates a battery and ultracapacitor cell configuration according to at least one embodiment;

FIG. 4 schematically illustrates a battery and ultracapacitor cell configuration according to at least one embodiment;

FIG. 5 schematically illustrates a battery and ultracapacitor cell configuration according to at least one embodiment;

FIG. 8 diagrams the steps of the process for using a battery and ultracapacitor cell according to at least one embodiment.

DETAILED DESCRIPTION

Reference will now be made in detail to compositions, embodiments and methods set forth herein, which include the best mode of practicing the invention presently known to the inventors. But, it should be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the operating examples, or where otherwise expressly indicated, all numbers in this description indicating material amounts, reaction conditions, or uses are to be understood as modified by the word "about" in describing the invention's broadest scope. Practice within the numerical limits stated is generally preferred. Also, unless expressly stated to the contrary:

(i) percent and ratio values are by weight;

a material group or class described as suitable or preferred for a given purpose in connection with the invention implies any two or more of these materials may be mixed and be equally suitable or preferred;

(ii) constituents described in chemical terms refer to the constituents at the time of addition to any combination specified in the description, and does not preclude chemical interactions among mixture constituents once mixed;

(iii) an acronym's first definition or other abbreviation applies to all subsequent uses here of the same abbreviation and mutatis mutandis to normal grammatical variations of the initially defined abbreviation; and (iv) unless expressly stated to the contrary, measurement of a property is determined by the same technique as previously or later referenced for the same property.

Figure 1:
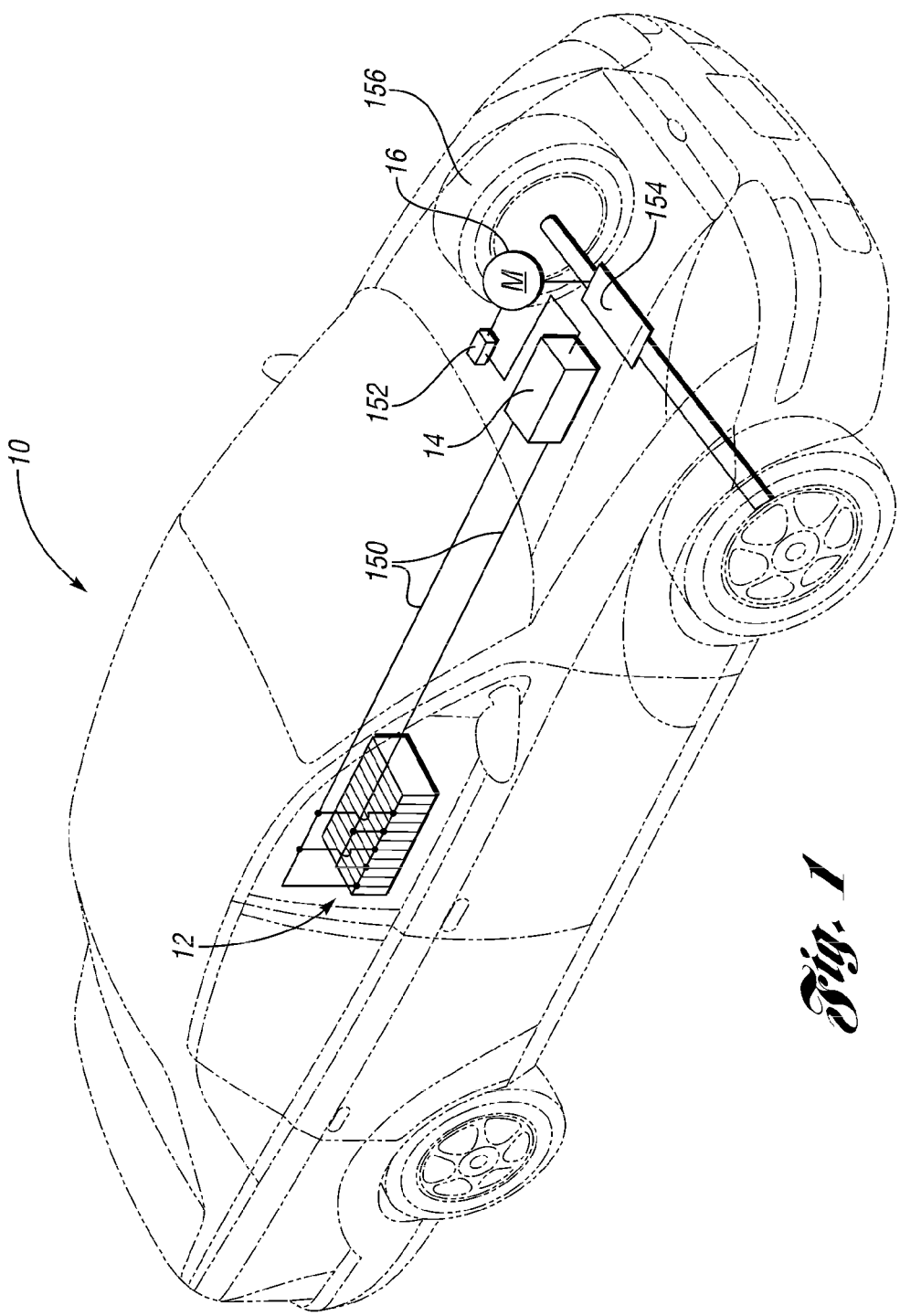
FIG. 1 illustrates a hybrid electric vehicle having a battery and ultracapacitor device according to at least one embodiment.

FIG. 1 illustrates a hybrid electric vehicle (HEV) 10 according to at least one embodiment. Connected to the HEV 10 is a battery and ultracapacitor device 12 including and electrically communicating directly or indirectly with a controller 14. The controller 14 electrically communicates with a traction motor 16. Traction motor 16 is connected to at least one wheel 156 of the vehicle 10 through a power-transmission 154.

According to at least one embodiment, battery and ultracapacitor device 12 electrically communicates with and provides energy to a high-voltage bus 150. High-voltage bus 150 electrically communicates with and provides energy to a DC/DC converter 152. The DC/DC converter 152 electrically communicates using a signal network with the traction motor 16.

While the battery and ultracapacitor device 12 is illustrated as supplying power to traction motor 16, the battery and ultracapacitor device 12 may be used to power other electrical loads on the vehicle 10, such as electrically powered accessories, without departing from the scope or spirit of the embodiment.

Figure 2:
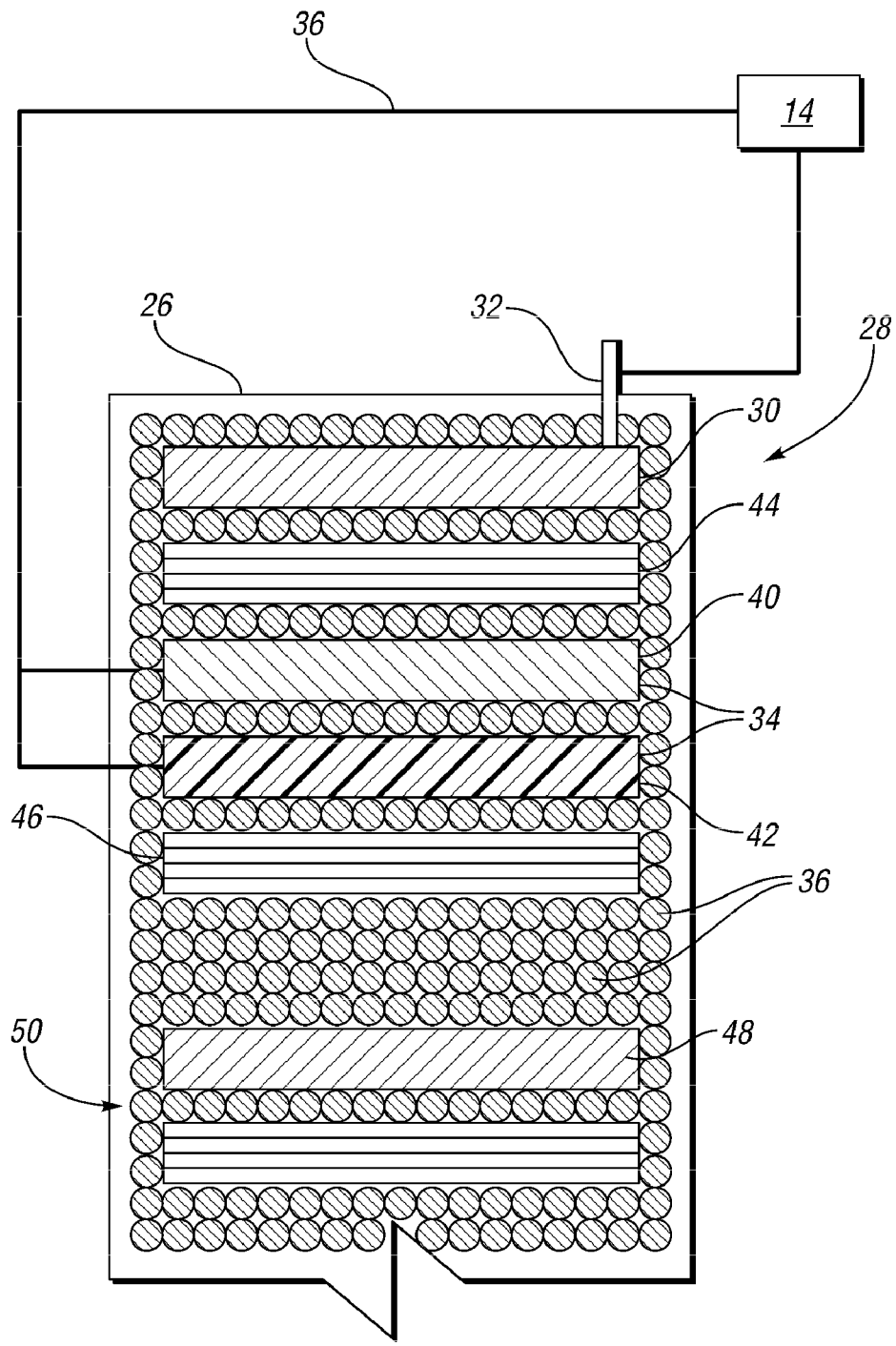
FIG. 2 schematically illustrates a battery and ultracapacitor cell of a battery and ultracapacitor device according to at least one embodiment.

FIG. 2 schematically illustrates a battery and ultracapacitor cell 28 according to at least one embodiment. The battery and ultracapacitor device 12 may comprise a plurality of battery and ultracapacitor cells 28. The battery and ultracapacitor cell 28 includes a housing 26 covering a positive electrode 30 which is electrically communicating with controller 14 through a first electrical conduit 32, such as an electrical cable or wire. Controller 14 also electrically communicates with combined negative electrodes 34 through a second electrical conduit 36.

It is understood that since the battery and ultracapacitor cells 28 are reversibly chargeable and dischargeable, the negative electrode during charging may be a cathode, where a reduction reaction occurs, and the positive electrode may be an anode, where an oxidation reaction occurs. During discharging, the negative electrode may be the anode and the positive electrode may be the cathode.

Combined negative electrodes 34 have a metal hydride electrode 40 and a double layer electrode 42 disposed adjacent to the metal hydride electrode 40. Situated between positive electrode 30 and combined negative electrode 34 is a first separator 44 that inhibits the flow of electrons between positive electrode 30 and combined negative electrodes 34. Situated between positive electrode 30 and combined negative electrodes 34 is an electrolyte 36 capable of facilitating migration of electrons between positive electrode 30 and combined negative electrodes 34. A second separator 46 electrically isolates the double layer electrode 42 from a proximate positive electrode 48 disposed in another battery and ultracapacitor cell 50 (fragmentarily illustrated), which optionally may be located nearby.

In at least one embodiment, metal hydride electrode 40 has a hydrogen content ranging from 0.1 wt. % hydrogen to 3 wt. % hydrogen. In another embodiment, metal hydride electrode 40 has a hydrogen content ranging from 0.5 wt. % hydrogen to 2.5 wt. % hydrogen. In yet another embodiment, the metal hydride electrode 40 comprises a misch-metal nickel-based hydride alloy composition electrode.

Positive electrode 30, double layer electrode 42, first separator 44 and second separator 46 comprise an ultracapacitor.

Positive electrode 30, metal hydride electrode 40, and first separator 44 comprise a battery cell.

In at least one embodiment, positive electrode 30 comprises a nickel oxyhydroxide (NiOOH) composition. In another embodiment, positive electrode 30 comprises nickel oxyhydroxide particles with a coating layer covering at least a part of a surface of each nickel oxyhydroxide particle. Positive electrode 30 is mainly composed of a nickel compound having an average valence of nickel more than 2, and an additive containing Nb and Y distributed among the nickel oxyhydroxide particles. In another embodiment, positive electrode 30 may comprise a porous nickel composition structure including a portion of positive electrode 30 having the nickel oxyhydroxide composition.

It should be understood that positive electrode 30 may comprise one or more crystalline structures of nickel oxyhydroxide, such as the alpha, beta, or gamma crystalline structures. It is further understood that the nickel oxyhydroxide composition may be a non-stoichiometric composition, may include a combination of nickel atoms in different oxidation states, and may be transformed to one or more different compositions by prolonged exposure to the electrolyte 36. It is yet further understood that positive electrode 30, in addition to the nickel oxyhydroxide composition, may include additional alloys and/or additives.

In at least one embodiment, combined negative electrode 34 comprises a hydrogen storage alloy and an ultracapacitor negative electrode. The hydrogen storage alloy comprises a composition reversibly forming a mixture of metal hydride compounds. In at least one embodiment, the hydrogen storage alloy comprises an intermetallic composition having two or more solid phase metallic elements. In another embodiment, the intermetallic composition optionally includes one or more non-metallic elements, whose crystal structure differs from that of the metallic constituents. Non-limiting examples of intermetallic compositions include two classes: an $AB_5$ composition where A is a rare earth mixture of lanthanum, cerium, neodymium, praseodymium and B is nickel, cobalt, manganese, and/or aluminum; and an $AB_2$ composition, where A is titanium and/or zirconium, and B is vanadium or nickel, modified with chromium, cobalt, iron, and/or manganese.

The ultracapacitor negative electrode, in at least one embodiment, comprises a double-layer negative electrode. Non-limiting examples of compositions comprising the double-layer negative electrode include a carbon-based negative electrode having activated carbon, activated charcoal, graphene, and/or carbon nanotubes; an aerogel; and/or barium titanate.

Turning now to FIG. 3, at least one embodiment of a battery and ultracapacitor cell 28 configuration is schematically illustrated in an overlaid fashion. Combined negative electrode 34 includes metal hydride electrode 40 as a layer 60 having a longitudinal axis 62 and a surface 64 parallel to the longitudinal axis 62. Combined negative electrode 34 further includes double layer electrode 42 as a layer 66 having a longitudinal axis 68 and a surface 70 parallel to the longitudinal axis 68. Surface 64 and surface 70 are situated adjacent to one another such that layer 60 and layer 66 are overlaid.

Turning now to FIG. 4, at least one embodiment of a battery and ultracapacitor cell 28 configuration is schematically illustrated. Combined negative electrode 34 includes metal hydride electrode 40 as a layer 80 having an end 82. Combined negative electrode 34 further includes double layer electrode 42 as a layer 86 having an end 88. End 82 and end 88 are situated adjacent to one another such that layer 80 and layer 86 are aligned end-by-end.

Turning now to FIG. 5, yet another embodiment of a battery and ultracapacitor cell 28 configuration is schematically illustrated. Combined negative electrode 34 includes metal hydride electrode 40 as a first segment 100 having an end 102. Combined negative electrode 34 further includes double layer electrode 42 as a second segment 106 having ends 108 and 110. End 102 and end 108 are situated adjacent to one another such that segment 100 and segment 106 are aligned end-by-end. Combined negative electrode 34 further includes a second segment 112 of metal hydride electrode 40. The second segment 112 has an end 114. End 114 and end 110 are situated adjacent to one another such that segments 106 and 112 are aligned end-by-end. It should be understood that configurations of FIG. 5 may have variations of segments.

Electrolyte 36, in at least one embodiment, is an electrically active solid and/or liquid that is polarizable by the negative and positive electrodes. Cations and anions are produced at the electrodes and are arranged in a double layer by static electricity in the ultracapacitor. During charging and discharging processes, the cations and anions migrate in the electrolyte. Moving in opposite directions, the cations and anions establish the double layer thereby storing energy. Non-limiting examples of electrolyte 36 include at least one of dissociable salts, such as potassium hydroxide, NaOH and/or LiOH, in an aqueous solution. The concentration of the salts may range from 0.2-8 molar.

Separators 44 and 46, in at least one embodiment, are a polymeric composition substrate. Non-limiting examples of the polymeric composition substrate include a polyamide film, an acrylic-acid-grafted non-woven web, or a sulfonated polyolefin non-woven web. The separators 44 and 46 have thicknesses ranging from 50 micrometers to 200 micrometers in certain embodiments.

Figure 7:
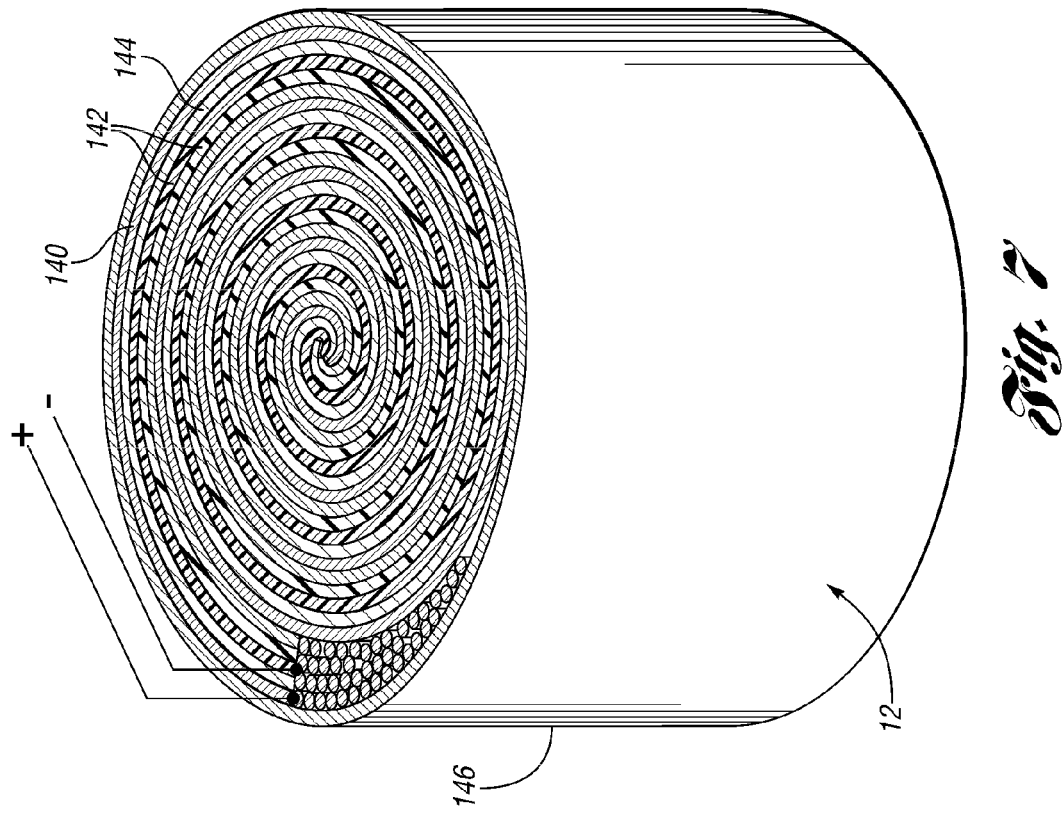
FIG. 7 schematically illustrates a cylindrical configuration of a battery and ultracapacitor cell according to at least one embodiment.
Figure 6:
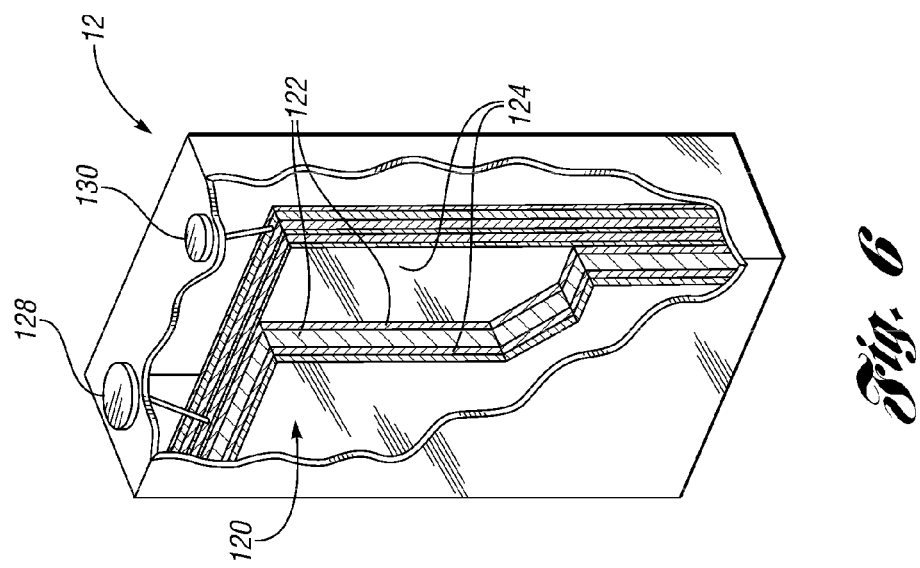
FIG. 6 schematically illustrates a prismatic configuration of a battery and ultracapacitor cell according to at least one embodiment.

Turning now to FIGS. 6 and 7, battery and ultracapacitor device 12 may be configured, in at least one embodiment, as a prismatic configuration. In another embodiment, battery and ultracapacitor device 12 may be configured as a cylindrical configuration.

In FIG. 6, at least one embodiment of battery and ultracapacitor device 12 is the prismatic configuration of the device 12 is obtained by winding a belt form 120 of the positive electrode and a belt form 122 of negative electrode with an interleaved separator 124 situated therebetween. The prismatic configuration is situated in a housing 126 including a positive terminal 128 and a negative terminal 130 electrically isolated from one another and electrically connected to the positive electrode 120 and negative electrode 122, respectively.

In FIG. 7, at least one embodiment of battery and ultracapacitor device 12 is schematically illustrated in a cylindrical configuration obtained by rolling a sheet form 140 of the positive electrode and a sheet form 142 of negative electrode with an interleaved separator 144 situated therebetween. The cylindrical configuration is situated in a housing 146, including a positive terminal 148 and a negative terminal 140 electrically isolated from one another and electrically connected to the positive electrode 140 and negative electrode 142, respectively.

Turning now to FIG. 8, in at least one embodiment, a method for using battery and ultracapacitor device 12 is diagrammatically illustrated when powering an electrical motor for use in a vehicle having an electrical charging system. The battery and ultracapacitor cell 28 comprises the nickel oxyhydroxide positive electrode 30, the combined negative electrode 34 comprising a metal hydride negative electrode 40 portion and an active carbon negative electrode portion communicating with the positive electrode 30. The positive electrode 30 and the active carbon negative electrode portion comprise an ultracapacitor portion of the cell. The positive electrode 30 and the metal hydride negative electrode 40 portion comprise a battery portion of the cell. The electrolyte 36 and the separator 44 are disposed between the positive electrode and the combined negative electrode.

The method of use of the battery and ultracapacitor cell 28, in at least one embodiment, may include the steps of:

(i) step 160, controlling an electron flow from the negative electrode with a single controller for the battery and ultracapacitor cell 28 when electrically discharging the battery and ultracapacitor cell 28; and (ii) step 162, powering the electrical motor with the electron flow.

When electrically charging battery and ultracapacitor cell 28, an additional step 164 includes controlling the electron flow to the negative electrode.

When constructing the battery and ultracapacitor cell 12, the combined negative electrode 34 may include the step 166 of patterning the combined negative electrode with the metal hydride and active carbon in an overlaid configuration.

When electrically discharging the battery and ultracapacitor device 12, step 160 may further include the step 168 of controlling the electron flow substantially from the ultracapacitor during a pulse time period such that a current partition occurs between the battery and ultracapacitor portions of combined negative electrode 34 as a consequence of different internal resistances between the portions.

Step 168, in certain embodiments, may prevent damage to the battery portion of combined negative electrode 34 from the high current pulses emanating from the ultracapacitor during the pulse time period.

In certain embodiments, battery and ultracapacitor device 12 reduces the need for multiple control devices from at least three controllers (i.e. a controller for each of the battery, the ultracapacitor and a master controller controlling the battery and ultracapacitor controllers) to a single controller, thereby reducing the cost of battery and ultracapacitor device 12. Further, battery and ultracapacitor device 12 has the desirable advantage of having less weight and space requirements because of the reduced number of controllers.

Battery and ultracapacitor device 12 may have the further desirable advantage of providing 25% or more of relatively high rate, short pulse time period, current pulses. Relatively more of the operation of the HEV may be conducted using the ultracapacitor portion of battery and ultracapacitor device 12. At least 30% of the HEV operating load may be supplied by the ultracapacitor portion of the device 12. The relative reduction of the supplying of the load by the metal hydride battery, may extend the lifetime of the metal hydride portion of the device 12, Extending the lifetime of the metal hydride portion may reduce the need for an extra amount of metal hydride battery to mitigate the reduction in metal hydride supply of the load over the life of the vehicle. The ultracapacitor portion may allow for relatively higher power capability, which, in turn, allows for smaller size and reduced weight of the device 12 while providing the same power.

Further, economically including the ultracapacitor with the battery in a device may have a desirable advantage during low temperature power performance because ultracapacitors are relatively more robust than batteries at relatively low temperatures. Previous HEV power devices were relatively larger since the power devices were sized to mitigate the effect of the relatively lower low temperature power of the metal hydride battery. In addition, the presence of active carbon in the negative electrode, in some embodiments, decreases the internal resistance to electron flow, improving power delivery in all ranges of temperatures. Further, the reduced internal resistance, may increase the efficiency of the device because more energy is available for work because less energy has been dissipated as heat through internal cell heating.

At the cellular scale, when combining the metal hydride negative electrode and the ultracapacitor negative electrode, the substitution of a relatively expensive metal hydride composition with less expensive active carbon composition may reduce the overall device cost.

While embodiments of the invention have been illustrated and described, it is not intended that these embodiments illustrate and describe all possible forms of the invention. Rather, the words used in the specification are words of description rather than limitation. It is understood that various changes may be made with departing from the spirit and scope of the invention.

What is claimed:

1. A battery and ultracapacitor device for use in a vehicle, comprising:
    (a) a positive electrode;
    (b) a first negative electrode having a first composition and a first internal resistance, the first negative electrode communicating with the positive electrode;
    (c) a second negative electrode having a second composition and a second internal resistance the second negative electrode being adjacent the first negative electrode and communicating with the positive electrode and the first negative electrode;
    (d) a first separator disposed between the positive electrode and the first and second negative electrodes, and
    (e) a controller communicating with the positive electrode, and the second negative electrode,
wherein in the first negative electrode comprises a secondary battery negative electrode and the second negative electrode comprises an ultracapacitor negative electrode.

2. The device of claim 1, wherein the first and second negative electrodes are combined to form a combined negative electrode.

3. The device of claim 2, wherein the combined negative electrode includes a plurality of portions of the first negative electrode, disposed between portions the first negative electrode is the second negative electrode at least one portion of the second negative electrode disposed therebetween.

4. The device of claim 1, further comprising a second separator disposed proximate to the second negative electrode, wherein the first negative electrode is spaced apart from the second separator.

5. The device of claim 1, wherein at least a portion of the first negative electrode contacts the second negative electrode.

6. The device of claim 1, wherein the first composition comprises a metal hydride.

7. The device of claim 6, wherein the metal hydride comprises a misch-metal nickel-based hydride alloy composition electrode.

8. The device of claim 6, wherein the first composition further includes carbon.

9. The device of claim 1, wherein the first internal resistance exceeds the second internal resistance, by an amount effective to partition a current between the first negative electrode and the second negative electrode.

10. A battery and ultracapacitor device for use in a vehicle, comprising:
    (a) a secondary battery cell including a positive electrode and a first negative electrode comprising a first segment; and
    (b) an electrochemical double-layer capacitor comprising the positive electrode and a second negative electrode comprising a second segment, the first negative electrode being adjacent to the second negative electrode.

11. The device of claim 10, wherein the first and second segments comprise a combined negative electrode.

12. The device of claim 10, further comprising a single controller for controlling the device, the controller communicating with the secondary battery cell and the electrochemical double-layer capacitor.

13. The device of claim 10, wherein the positive electrode, first negative electrode and second negative electrode comprises a cylindrical device design.

14. The device of claim 10, wherein the electrochemical double-layer capacitor includes a double layer active carbon electrode.

15. The device of claim 10, wherein the secondary battery is a nickel metal hydride battery.

16. A method for powering an electrical motor for use in a vehicle having an electrical charging device and using a battery and ultracapacitor device comprising a nickel oxyhydroxide positive electrode, a combined negative electrode comprising a metal hydride negative electrode portion and an active carbon negative electrode portion communicating with the positive electrode, the positive electrode and the active carbon negative electrode portion comprising an ultracapacitor portion of the device, the positive electrode and the metal hydride negative electrode portion comprising a battery portion of the device, and a separator disposed between the positive electrode and the combined negative electrode, the method comprising the steps of:
    (a) controlling a current from the negative electrode using a single controller for the battery and ultracapacitor device when electrically discharging the device; and
    (b) powering the electrical motor of the vehicle using the electron flow.

17. The method of claim 16, further comprising the step of:
    (c) controlling the electron flow out of the positive electrode when charging the device.

18. The method of claim 16, further comprising step of:
    (c) patterning the combined negative electrode with the metal hydride and active carbon in an overlaid pattern.

19. The method of claim 16, further comprising the step of:
    (c) pardoning the current when the device is electrically discharging.

* * * * *